C. JOHNSON.
MACHINE FOR UNITING MATCHED BOARDS.
APPLICATION FILED OCT. 7, 1907.

915,096.

Patented Mar. 16, 1909.
4 SHEETS—SHEET 1.

WITNESSES
OMWalstrom
J. B. Byington

INVENTOR
CHARLES JOHNSON
BY Paul & Paul
HIS ATTORNEYS

C. JOHNSON.
MACHINE FOR UNITING MATCHED BOARDS.
APPLICATION FILED OCT. 7, 1907.

915,096.

Patented Mar. 16, 1909.
4 SHEETS—SHEET 3.

WITNESSES

INVENTOR
CHARLES JOHNSON
BY
HIS ATTORNEYS

C. JOHNSON.
MACHINE FOR UNITING MATCHED BOARDS.
APPLICATION FILED OCT. 7, 1907.

915,096.

Patented Mar. 16, 1909.
4 SHEETS—SHEET 4.

WITNESSES

INVENTOR
CHARLES JOHNSON
BY Paul & Paul
HIS ATTORNEYS

UNITED STATES PATENT OFFICE.

CHARLES JOHNSON, OF MINNEAPOLIS, MINNESOTA, ASSIGNOR TO MEREEN-JOHNSON MACHINE CO., OF MINNEAPOLIS, MINNESOTA, A CORPORATION OF MINNESOTA.

MACHINE FOR UNITING MATCHED BOARDS.

No. 915,096.  Specification of Letters Patent.  Patented March 16, 1909.

Application filed October 7, 1907. Serial No. 396,213.

*To all whom it may concern:*

Be it known that I, CHARLES JOHNSON, of Minneapolis, Hennepin county, Minnesota, have invented certain new and useful Improvements in Machines for Uniting Matched Boards, of which the following is a specification.

The object of my invention is to provide a machine for uniting the matched boards comprising the bottom, sides and top of a box, and the object of the invention is to improve the machine shown and described in a certain pending application for United States patent filed by Arno Mereen and myself, May 4, 1905, Serial No. 258,793.

My invention consists generally in various constructions and combinations, all as hereinafter described and particularly pointed out in the claims.

Figure 1:
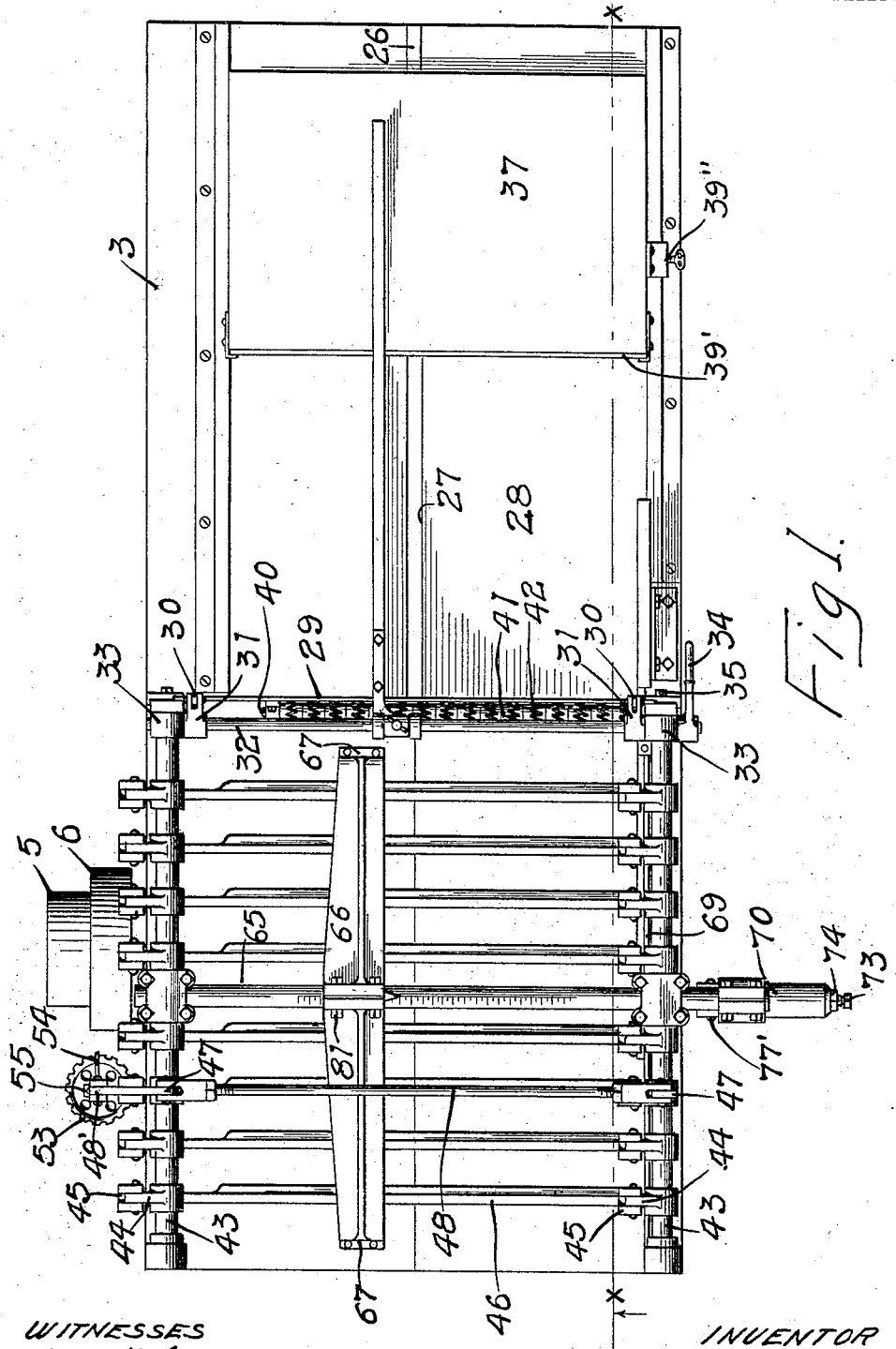
Figure 2:
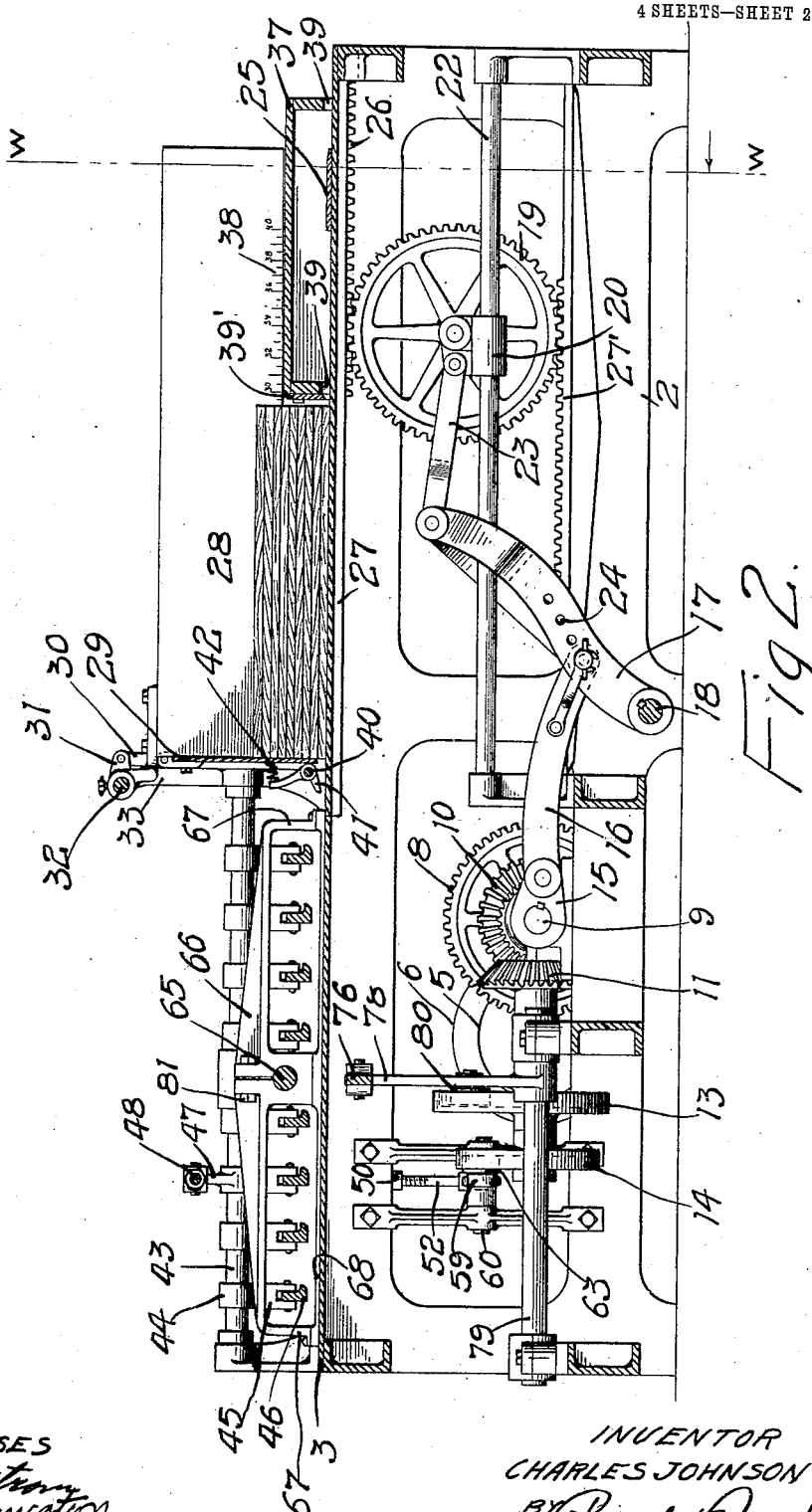
Figure 3:
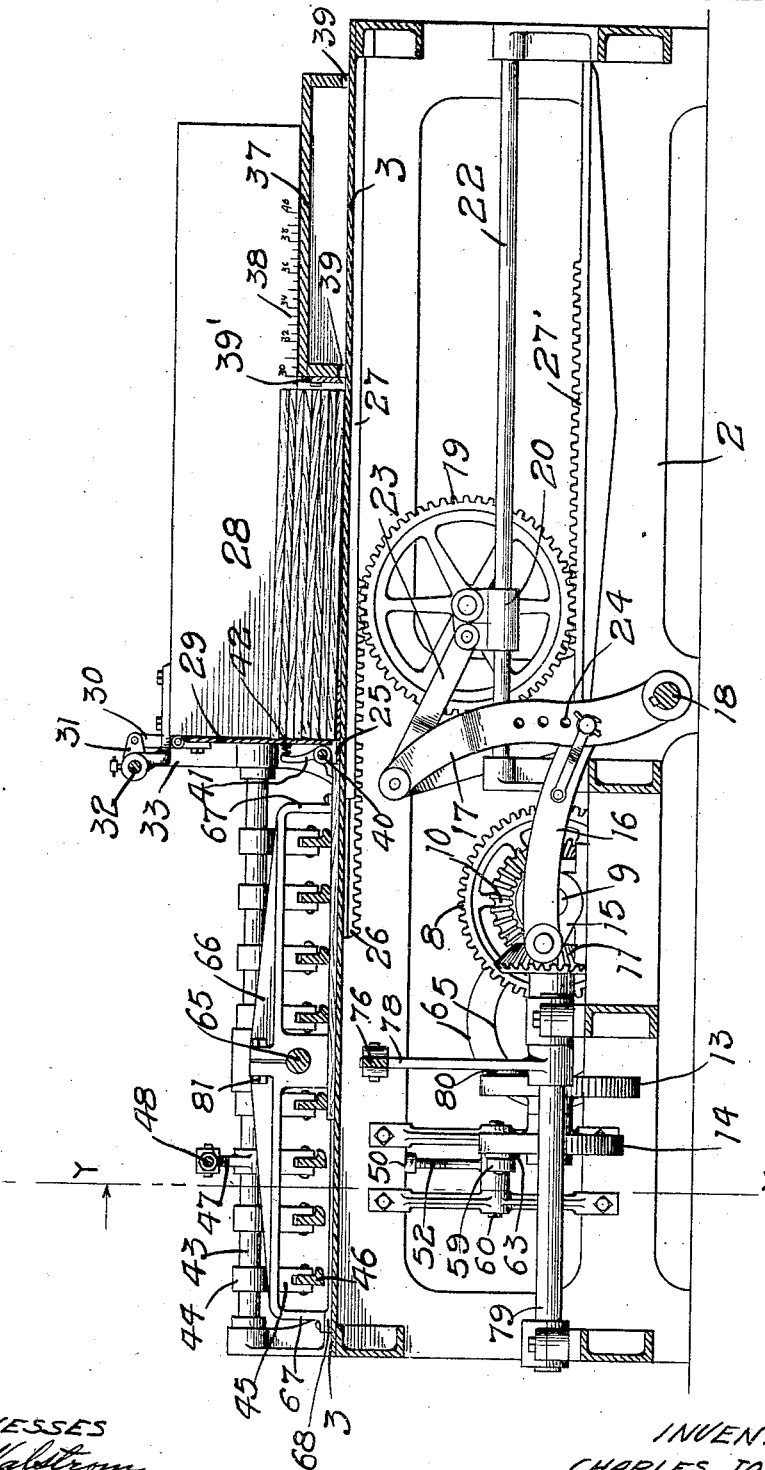
Figure 4:
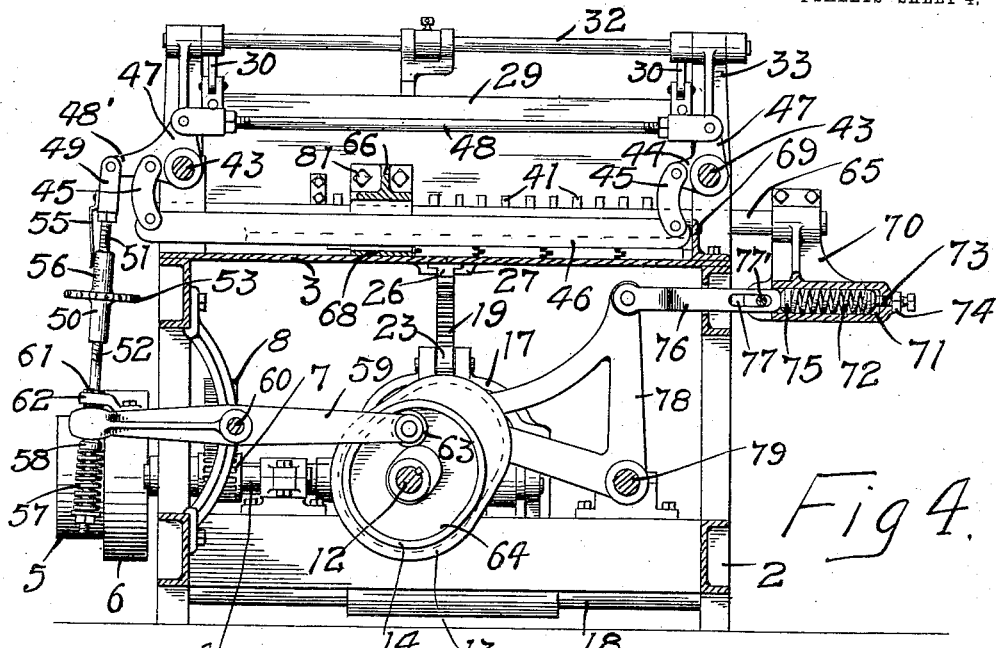
Figure 5:
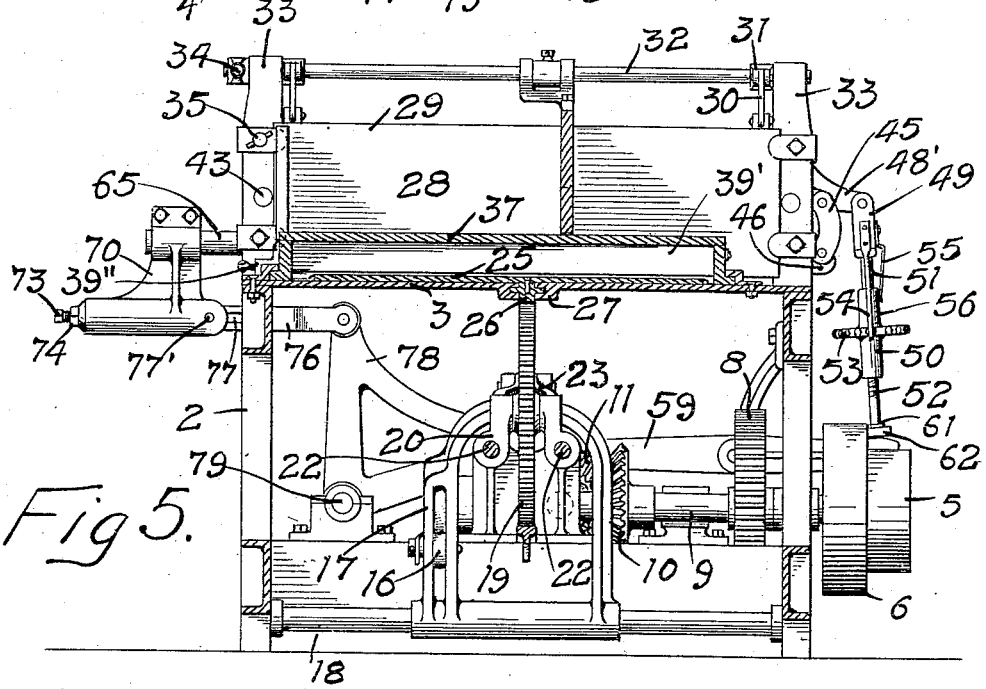

In the accompanying drawings, forming part of this specification, Figure 1 is a plan view of the machine. Fig. 2 is a longitudinal vertical sectional view on the line $x$—$x$ of Fig. 1 showing the normal position of the parts when the machine is ready for use. Fig. 3 is a similar view showing the position assumed by the parts when the feed device has advanced a board out of the hopper into the path of the uniting or squeezing mechanism. Fig. 4 is a transverse vertical sectional view on the line $y$—$y$ of Fig. 3. Fig. 5 is a similar view on the line $w$—$w$ of Fig. 2.

In the drawing, 2 represents a suitable frame having a flat top 3 whereon the feeding and squeezing mechanism of the machine is mounted.

4 is the drive shaft having pulleys 5 and 6 for connection with a source of power.

7 is a pinion mounted on the drive shaft and meshing with a gear 8 on a shaft 9. A beveled gear 10 is secured on the shaft 9 and meshes with a similar gear 11 on a cam shaft 12. On this cam shaft two cams 13 and 14 are secured, the purpose of which will be hereinafter explained. A crank 15 is secured on the shaft 9 and has a link connection 16 with a yoke 17 that is supported at 18 and has an oscillating movement back and forth lengthwise of the machine.

19 is a large gear wheel having sliding bearings 20 on parallel rods 22 which are straddled by the arms of the yoke 17, and a forked link 23 pivotally connects the yoke 17 with the bearings 20 of the gear wheel 19. The yoke 17 has a series of holes 24 therein and the link 16 has an adjustable connection with said yoke through said holes. By changing the adjustment of the link with the yoke the backward movement of the gear wheel and the feed device connected therewith can be increased or decreased according to the length of the boards in the hopper while the forward stroke of the feed device will remain the same.

A feed plate 25 is arranged to slide on the table 3 and is secured to a rack bar 26 that is slidable in guides 27 on the under side of said table, and whose teeth mesh with the gear 19 to be driven forward thereby when the wheel is operated. A fixed rack bar 27' is mounted below the wheel and has its teeth in engagement therewith. When power is applied to the yoke 17 the wheel will be drawn forward and through its engagement with the fixed rack bar will be rotated also and the movable rack bar will be driven forward to advance the feed plate over the table and feed the bottom layer of boards out of the hopper. The hopper corresponds to the one described in the application above referred to and is designated by reference numeral 28 and is provided with a vertically adjustable wall 29 supported by links 30 from crank arms 31 on a rock shaft 32 that has bearings in standards 33 and is operated by means of a lever 34. A thumb screw 35 permits the locking of the rock shaft in any desired position. By the adjustment of the shaft 32 the wall 29 of the hopper can be raised or lowered to vary the distance between its lower edge and the top of the table according to the thickness of the boards in the hopper. The rear end of the hopper is open as well as the top, and a platform 37 is provided therein upon which the attendant piles the boards preparatory to pushing them into the path of the feed plate. A scale 38 is provided on the side wall of the hopper and the platform is adjusted back and forth therein until the distance between the front wall of the hopper and the platform will correspond substantially to the length of the boards in the hopper. The walls of the platform have recesses 39 formed therein to permit passage of the feed plate and allow the platform to be pushed back and forth in the hopper over said plate. A shaft 40 is mounted on the wall 29 of the hopper and a series of dogs 41 are carried by said shaft and are normally held in engagement with the upper surfaces of the boards fed out of the hopper, by means of springs 42. These dogs bear on the upper surfaces of the boards with sufficient pressure to retard their momentum and to insure the ends of the boards being in alinement with one another when the feed plate begins its backward stroke. This feed differs from the one shown in the application above referred to as the feed device moves with substantially the same speed in the backward as well as the forward portion of its stroke.

On the forward end of the platform 37 I provide a vertical sliding board 39' having a beveled lower edge and adapted to be raised by the passage of the feed plate 25. As soon as this feed plate has passed out from under the platform the board 39' will drop down behind it and prevent the bottom board from being pushed back under the platform on the return stroke of the feed plate. The rear edge of the feed plate is beveled as indicated in Fig. 2 so that it will easily pass under the board 39' on its return stroke. On one side of the machine a clamping device 39" is provided by means of which the platform can be secured in any desired position on the hopper.

Upon each side of the machine above the table 3 I provide a shaft 43 having arms 44 secured thereon at intervals, said arms being pivotally connected by links 45 with the ends of presser bars 46 which extend transversely of the machine near the top of the table. These presser bars have lower faces that are adapted to engage the tops of the boards and hold them flat upon the table during the operation of squeezing their edges together. For the purpose of raising or lowering the presser bars I provide arms 47 connected by a tie rod 48 across the machine, one of the arms 47 having an extension 48' to which a link 49 is pivotally connected. A turn buckle device 50 is connected at its ends with threaded rods 51 and 52, the former being attached to the link 49. The turn buckle has a notched wheel 53 thereon engaged by a spring 54 to prevent it from turning accidentally, and an indicator 55 is arranged to move over a scale 56 on the turn buckle by means of which the proper adjustment of the device can be determined. The lower end of the rod 52 is provided with a spring 57 that is arranged to be compressed by the movement of a nut 58 on said rod. A lever 59 is pivoted at 60 and has a forked end to straddle the rod 52 and bear on the nut 58. This end is normally held in contact with the lever by the tension of the spring 57. A collar 61 is secured on the rod 52 and a clip 62 mounted on the lever straddles the collar and serves to lift the rod and return the parts to their normal position when the squeezing operation has been completed. The other end of the lever 59 has an anti-friction roller 63 arranged to travel in the track 64 of the cam 14. This cam track is so arranged that the lever will be rocked and the presser bars lowered to grip the boards immediately following the completion of the stroke of the feed plate.

For the purpose of squeezing the boards together when they have been properly alined I provide a cross rod 65 whereon a yoke 66 is mounted and secured, said yoke having depending ends 67 connected by a plate 68. This plate is arranged to slide transversely on the table and engage the edge of the outer board and squeeze the edges of the series of boards together and against an angle plate 69 on the opposite side of the machine. The rod 65 has a sliding movement in its bearings and carries a bracket 70 at one end having a socket 71 containing a spring 72. A screw 73 in one end of the socket is adapted to engage the spring and is adjustable by means of a lock nut 74. A flange 75 in the opposite end of the socket also engages the spring to compress it against the screw 73, the degree of compression being regulated by the adjustment of the screw. A link 76 has a slot 77 wherein a pin 77' is slidably mounted and the link 76 is pivotally connected with a bell crank 78 that is pivoted at 79 and has an anti-friction roller 80 arranged to enter the cam track in the cam 13 whereby upon the revolution of the cam the bell crank 78 will be rocked and a reciprocating movement will be imparted to the rod 65 through its yielding connection with the link 76. As the rod 65 is drawn out the presser plate 68 will be moved into contact with one edge of the contiguous board and will force its other edge and the edges of the other boards together to unite them and form the bottom, sides or top of the box. The presser plate is movable back and forth with the rod 65 by means of the clamping bolts 81 so that it can be adapted for the width of the feed of boards, and its movement is so timed that it will engage the edge of the contiguous board at the same time the bars 46 contact with the tops of the boards. The perfect union of the matched edges of the boards is thus insured.

The operation of the machine is as follows: A pile of boards having been placed in the hopper the operator will adjust the link 16 to regulate the stroke of the feed plate and the machine having been started the bottom layer of boards will be engaged by the feed plate and pushed forward out of the hopper into the path of the presser bar that has been adjusted already to the width of the feed. The spring-pressed dogs engaging the tops of the boards will hold them in alinement with one another until the feed is completed. The movement of the rod 65 will then advance the presser plate into engagement with the boards and cause their tongues and grooves to be squeezed together and thoroughly united. The presser plate will then recede, the bars will be raised and the feed device advancing another layer of boards out of the hopper, will push the first feed out from under the presser bars and discharge it at the end of the table.

I claim as my invention:—

1. In a machine for uniting matched boards, the combination, with a table adapted to receive side by side boards having matched contiguous edges, of a feed device operating to advance the boards endwise onto said table, a device for pressing the boards together, means for holding down the board while being pressed together, and frictional retarding devices located between the feed device and said holding down means and pressing device and arranged to contact with the top of the boards and limit the momentum of the boards, and insure their ends being brought in alinement with one another by the time of the completion of the feeding operation.

2. In a machine for uniting matched boards, the combination, with a table and a hopper thereon adapted to receive a series of boards placed one above another therein, a feed device operating to advance the boards endwise out of said hopper, a device for pressing the boards together when fed from out of said hopper, and a series of spring-pressed dogs having arms arranged to engage the tops of said boards to retard the momentum of the same during the feeding operation, said dogs being positioned between said pressing device and said hopper to exert their pressure upon the board while being fed out of the hopper and until brought into alined position within the path of said pressing device, substantially as described.

3. The combination, with a table, and a hopper thereon, of a platform arranged on said table within said hopper and having recesses in its end walls, a feed device operating on said table through said recesses to engage the bottom boards in the hopper, said hopper being adapted to contain a series of boards placed side by side therein, and also adjustable on said table to accommodate it to the length of the boards in the hopper, and a slide mounted on said platform and arranged to partially close one of the recesses in the wall of said platform to prevent the backward movement of a board through said recess during the return stroke of said feed device, substantially as described.

4. The combination, with a table, of a hopper mounted thereon and adapted to contain a series of boards placed side by side in a pile therein, a platform arranged in said hopper and from which the boards are pushed on to said table, said platform having recesses in its walls, a feed plate operating on said table through said recesses and adapted to engage and project the bottom boards of the series, and means arranged to prevent the boards from being carried back under said platform on the return stroke of the feed device, substantially as described.

5. The combination, with a feed table, of a feed device operating thereon, a rack bar secured to said feed device and adapted to move therewith, a fixed rack bar, a gear wheel having a sliding non-rotatable bearing and arranged to mesh with said movable and fixed rack bars, a guide-rod encircled by said slidable bearing, an oscillating yoke having a forked end and a forked link pivotally connecting said yoke to said sliding bearing, a drive shaft having a crank, a link pivotally connected thereto, and means adjustably connecting said link with said yoke whereby the stroke of said gear wheel and said feed device can be regulated.

6. The combination, with a feed table, and a hopper adapted to contain boards placed side by side and one upon another therein, a feed plate operating on said table and arranged to advance the boards out of said hopper, a drive shaft having a crank, a link pivoted thereon, an oscillating yoke, and means adjustably connecting said link and said yoke, and operative connections including a toothed wheel and rack bar and a slidable bearing for the wheel provided between said yoke and said feed plate, substantially as described.

7. The combination, with a feed table, and a hopper adapted to contain boards placed side by side and piled one upon another therein, a feed plate operating on said table, a fixed rack-bar, a movable rack-bar connected with the feed plate, guide-bars between said racks, a toothed wheel engaging said rack bars, slidable bearings for said wheel mounted on said guide-rods, an oscillating yoke located beneath said table and connected with said slidable bearings, said yoke having a series of holes, a link having means for connecting it to said yoke through said holes, and a driving shaft and a crank mounted thereon having a pivotal connection with said link.

8. The combination, with a table, of shafts supported above the same, a series of hangers carried by said shafts, a series of presser bars arranged transversely of said table, links connecting the ends of said presser bars with said hangers, a rod connecting two opposite hangers whereby simultaneous movement may be obtained for all of them, a rod connected to one of said hangers, a lever pivoted at a point intermediate to its ends and having a yielding connection with said rod, and a cam device arranged to oscillate said lever and operate said hangers to raise or lower said presser bars.

9. The combination, with a table, of shafts mounted above the same, hangers secured on said shafts, a series of presser bars, links connecting said presser bars with said hangers, a rod connecting two opposite hangers whereby simultaneous movement thereof may be obtained, a rod pivotally connected to one of said hangers and composed of threaded sections and a turn buckle device connecting said sections, a lever pivoted at a point intermediate to its ends and having a yielding connection with one of said threaded sections, and mechanism for oscillating said lever to operate said hangers and raise or lower said presser bars.

10. The combination, with a table, of a series of presser bars arranged above the same, oscillating hangers whereon said presser bars are supported, means connecting two opposite hangers, a rod composed of threaded sections pivotally connected to one of said hangers, a turn buckle device connecting said threaded sections and having a suitable scale thereon, a fixed pointer past which said scale is movable as said turn buckle device is rotated, and a lever mechanism yieldingly connected to one of said threaded rods and arranged to oscillate said hangers and raise or lower said presser bars, the degree of such raising or lowering being determined by the adjustment of said turn buckle, substantially as described.

11. The combination, with a table, of a presser plate operating transversely thereof and adapted to engage the edge of a board, a sliding rod, a yoke secured thereon and on which yoke said presser plate is mounted, a bracket secured on said sliding rod and having a socket, a compression spring therein, a plunger, an oscillating bell crank having a pivotal connection with said plunger, and means for oscillating said bell crank.

12. In a machine of the class described, the combination, with a sliding rod and a presser plate supported thereon, of a bracket secured on said rod and having a socket, a compression spring fitting within said socket, an adjusting screw whereby the degree of compression of said spring is regulated, a plunger arranged to slide in said socket, and means for operating said plunger to reciprocate said rod, substantially as described.

13. In a machine of the class described, the combination, with a transverse sliding rod and a presser plate supported thereon, of a bracket secured to said rod and having a socket, a compression spring therein, a plunger arranged to slide in said socket, a link having a sliding connection with said plunger, a rocking bell crank having a pivotal connection with said link, and a cam mechanism for oscillating said bell crank to reciprocate said rod and presser plate, substantially as described.

In witness whereof, I have hereunto set my hand this 27th day of September 1907.

CHARLES JOHNSON.

Witnesses:
RICHARD PAUL,
J. B. BYINGTON.